(12) United States Patent
Zhan et al.

(10) Patent No.: US 7,494,360 B2
(45) Date of Patent: Feb. 24, 2009

(54) SURFACE CONTACT CARD HOLDER

(75) Inventors: Zi-Gang Zhan, Shenzhen (CN); Chia-Hua Chen, Taipei Hsien (TW)

(73) Assignees: Shenzhen Futaihong Precision Industry Co., Ltd., ShenZhen, Guangdong Province (CN); Sutech Trading Limited, Tortola (VG)

( * ) Notice: Subject to any disclaimer, the term of this patent is extended or adjusted under 35 U.S.C. 154(b) by 0 days.

(21) Appl. No.: 11/610,632

(22) Filed: Dec. 14, 2006

(65) Prior Publication Data

US 2007/0197078 A1    Aug. 23, 2007

(30) Foreign Application Priority Data

Feb. 17, 2006    (CN) .................. 2006 1 0033804

(51) Int. Cl.
 *H01R 13/62* (2006.01)
(52) U.S. Cl. ...................... 439/326; 439/630

(58) Field of Classification Search ................. 439/326, 439/630, 325, 327
See application file for complete search history.

(56) References Cited

U.S. PATENT DOCUMENTS

| | | | | |
|---|---|---|---|---|
| 6,561,431 B2 * | 5/2003 | Roussy et al. | ................ | 235/492 |
| 6,831,977 B2 * | 12/2004 | Kiernan et al. | ......... | 379/433.09 |
| 7,238,038 B2 * | 7/2007 | Kumagai | .................... | 439/326 |
| 7,244,135 B2 * | 7/2007 | Chen et al. | .................. | 439/327 |
| 7,306,491 B1 * | 12/2007 | Wei | ........................... | 439/630 |
| 2006/0236014 A1 * | 10/2006 | Yin et al. | .................... | 710/303 |

* cited by examiner

*Primary Examiner*—Neil Abrams
(74) *Attorney, Agent, or Firm*—Steven M. Reiss

(57) ABSTRACT

A holder (100) for holding a surface contact card (40) includes a main body (10) and an elastic element (20). The main body forms a receiving portion (14). The receiving portion is configured for receiving the surface contact card therein. A latching portion (16) is adjacent to the receiving portion on the main body. The elastic element (20) is positioned in the latching portion and configured for selectably resisting the surface contact card.

12 Claims, 8 Drawing Sheets

SURFACE CONTACT CARD HOLDER

BACKGROUND OF THE INVENTION

1. Field of the Invention

The present invention generally relates to structures for holding card members in an electronic device and, particularly, to a surface contact card holder for holding a surface contact card in a portable electronic device.

2. Discussion of the Related Art

With the development of wireless communication and information processing technologies, portable electronic devices such as mobile phones are increasingly in widespread use. These electronic devices enable consumers to enjoy high-tech services anytime and anywhere. Surface contact cards having special circuits are widely used in portable electronic devices to enhance or specialize the functions of the portable electronic devices. For example, a subscriber identity module (SIM) card can be placed in a mobile phone to dedicate the mobile phone' functions to the SIM card owner. By changing SIM cards, a single mobile phone can be used by many different SIM card owners as a personal phone.

Referring now to FIG. 8, a conventional structure for holding a SIM card therein includes a base 62 made of insulating material and a holding structure 64. The base 62 defines a receiving groove 621 and a SIM connector 60 including a plurality of contacts is set in the middle of the receiving groove 621. The shape and size of the receiving groove 621 are the same as those of the SIM card. The holding structure 64 is located adjacent to one end of the receiving groove 621 and can be moved back and forth along the direction indicated by the arrow shown in FIG. 8.

In use, firstly, the holding structure 64 is moved away from the receiving groove 621, and the SIM card is inserted into the receiving groove 621. Then, the holding structure 64 is moved adjacent to the receiving groove 621 so as to latch the SIM card in the receiving groove 621. In the same way, the SIM card can be released by moving the holding structure 64 away from the receiving groove 621.

In the above conventional structure for holding a SIM card, the holding structure 64 can be easily moved. As such, if a mobile phone employing such a structure for holding a SIM card is dropped, the shock may easily force the holding structure 64 to move off the receiving groove 621. As a result, the SIM card may not connect well with the SIM contactor or may even become separated from the receiving groove 621 (i.e., potentially even lost). Obviously, such a conventional structure cannot hold the SIM card steadily in the receiving groove 621.

Therefore, there is a need for a new surface contact card holder which can hold a surface contact card steadily in a portable electronic device.

SUMMARY

In one embodiment, a holder for holding a surface contact card includes a main body and an elastic element. The main body forms a receiving portion. The receiving portion is configured (i.e., structured and arranged) for receiving the surface contact card therein. A latching portion is carried on the main body, and is adjacent to the receiving portion. The elastic element is positioned in the latching portion and is configured for selectably resisting the surface contact card.

Other advantages and novel features of the present embodiment will become more apparent from the following detailed description thereof when taken in conjunction with the accompanying drawings.

BRIEF DESCRIPTION OF THE DRAWINGS

Many aspects of the surface contact card holder can be better understood with reference to the following drawings. The components in the drawings are not necessarily drawn to scale, the emphasis instead being placed upon clearly illustrating the principles of the present surface contact card holder. Moreover, in the drawings, like reference numerals designate corresponding parts throughout the several views.

DETAILED DESCRIPTION OF THE EMBODIMENTS

The present surface contact card holder is suitable for portable electronic devices, such as mobile phones, PDAs, and so on. The surface contact card holder can be used for holding surface contact cards such as SIM cards, compact flash cards (CFs), multimedia cards (MMCs), and so on.

Figure 1:
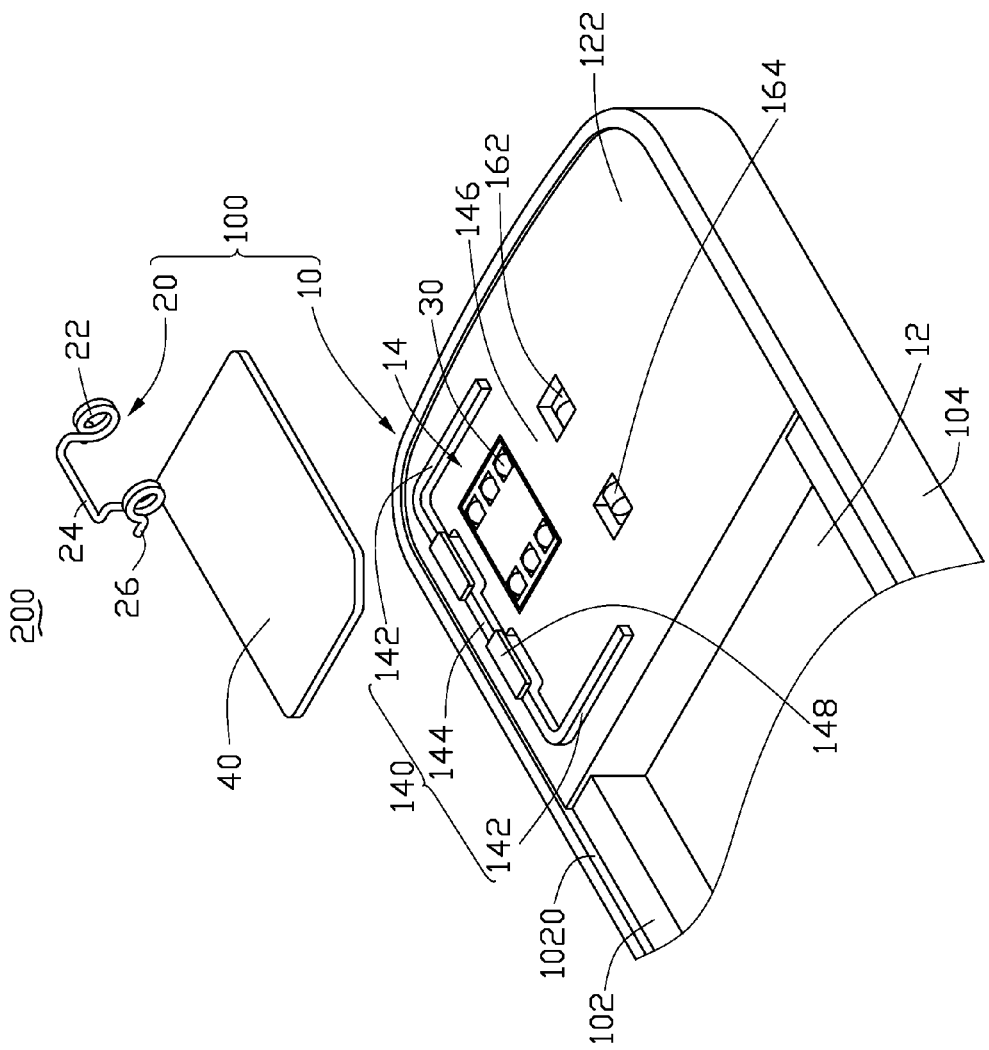
FIG. 1 is an exploded, isometric view of a surface contact card holder with a surface contact card, in accordance with a preferred embodiment.
Figure 2:
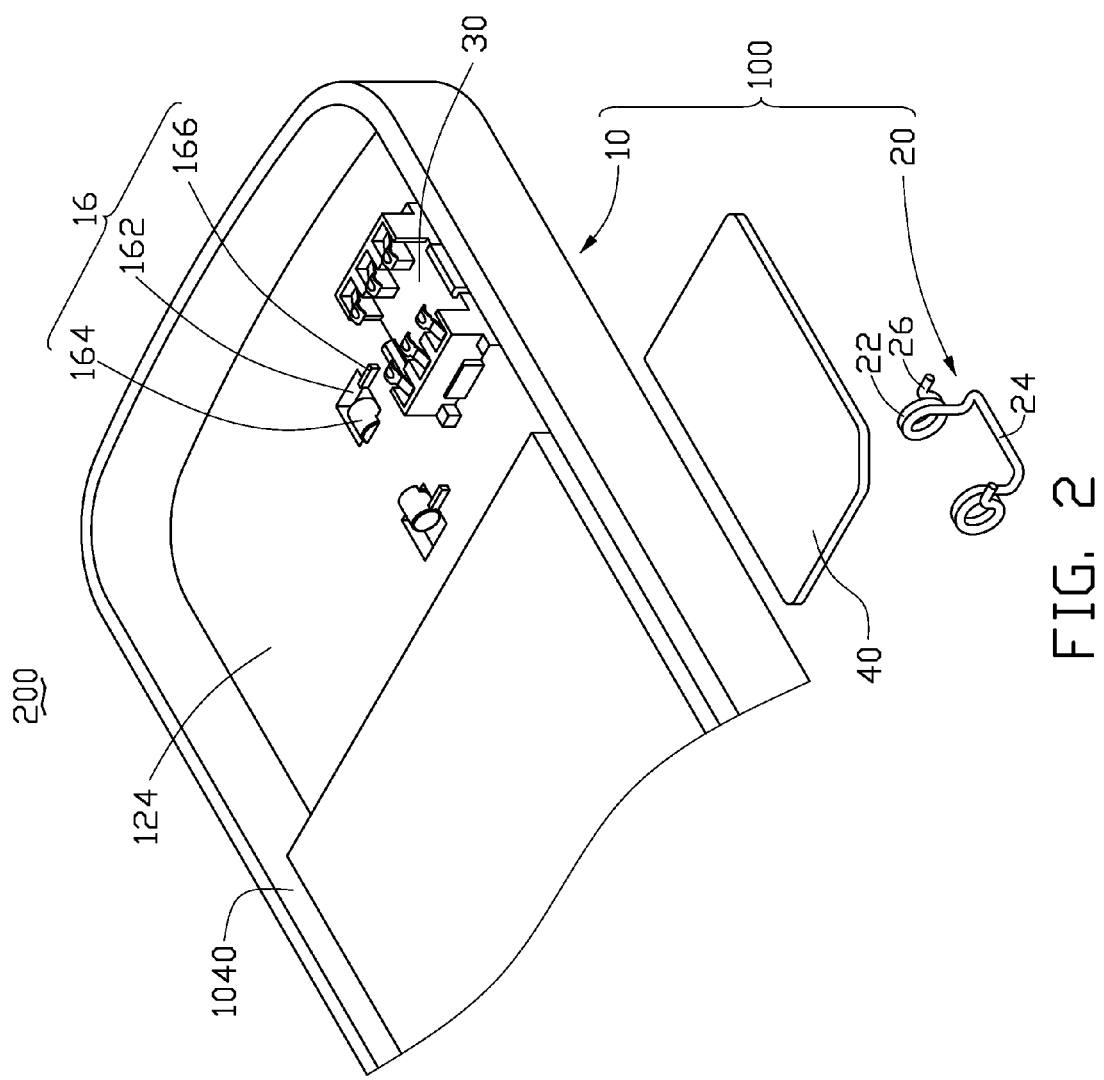
FIG. 2 is similar to FIG. 1 but viewed from another aspect.

Referring now to the drawings in detail, FIGS. 1 and 2 show a surface contact card holder 100 for a surface contact (e.g., SIM) card 40 incorporated in a mobile phone/portable electronic device 200. The electronic device 200 and the surface contact card 40 are taken here as an exemplary application for the purposes of describing details of the surface contact holder of the preferred embodiment.

The surface contact card holder 100 includes a main body 10 and an elastic element 20. The elastic element 20 may be attached to the main body 10.

The main body 10 can be a back housing of the electronic device 200. The main body 10 includes a main partition board 102 and a peripheral sidewall 104. The partition board 102 separates a first compartment 1020 from an opposite second compartment 1040. The first compartment 1020 is used to engagingly receive a battery cover. The second compartment 1040 is configured for accommodating a printed circuit board. This accommodation is achieved when the main body 10 is assembled with other housings (not shown) of the electronic device 200. The partition board 102 has a receiving cavity 12 defined in a middle lower portion and is adapted for receiving a battery (not shown) therein. The partition board 102 has a first surface 122 and an opposite second surface 124. One side of the receiving cavity 12 is substantially coplanar with the first surface 122, and the other side of the receiving cavity 12 is spaced apart from the second surface 124.

The first surface 122 has a receiving portion 14 formed adjacent to the receiving cavity 12. The receiving portion 14 partially surrounds a space configured for receiving the surface contact card 40. The receiving portion 14 includes a projection block 140. The projection block 140 is substantially a beam protruding on the main body 10. The projection block 140 includes two end portions 142 and a connecting portion 144. Each end portion 142 perpendicularly extends from a distal end of the connecting portion 144, co-operatively surrounding a [—shaped (i.e., shape of a rectangular bracket) area with an open side 146 (i.e., the side/surface thereof facing the opening end thereof). The open side 146 advantageously facilitates easy removal of the surface contact card 40, Two spaced rectangular bumps 148 are symmetrically formed on the connecting portion 144. Each bump 148 extends toward the open side 146 of the receiving portion 14 and is parallel with the first surface 122. A connector 30 is positioned in the receiving portion 14 and is configured for being electrically coupled to the surface contact card 40. Opposite to the receiving portion 14, a latching portion 16 is formed on the main body 10. The latching portion 16 includes two notches 162, two posts 164 and two protrusions 166. Each notch 162 communicates with the first surface 122 and the second surface 124. Each notch 162 is defined by four sidewalls. Each post 164 perpendicularly extends from one of sidewalls perpendicular to the connecting portion 144. The two posts 164 are positioned opposite to each other. One side of each post 164 is substantially coplanar with the first surface 122, while the other side of each post 164 is spaced apart from the second surface 124. Each post 164 is, usefully, substantially cylindrical. Each protrusion 166 is positioned adjacent to each post 164.

The elastic element 20 includes two bending portions 22 and a middle portion 24 connected to each other. Advantageously, such portions 22 and 24 are integral with one another. Each bending portion 22 has a resisting end 26 radially extending from a distal end thereof. Each bending portion 22 is, usefully, coiled to be a helical hollow cylinder. An inner diameter of each bending portion 22 is slightly larger than that of a corresponding post 164 so that each bending portion may be placed around a given post 164.

Figure 3:
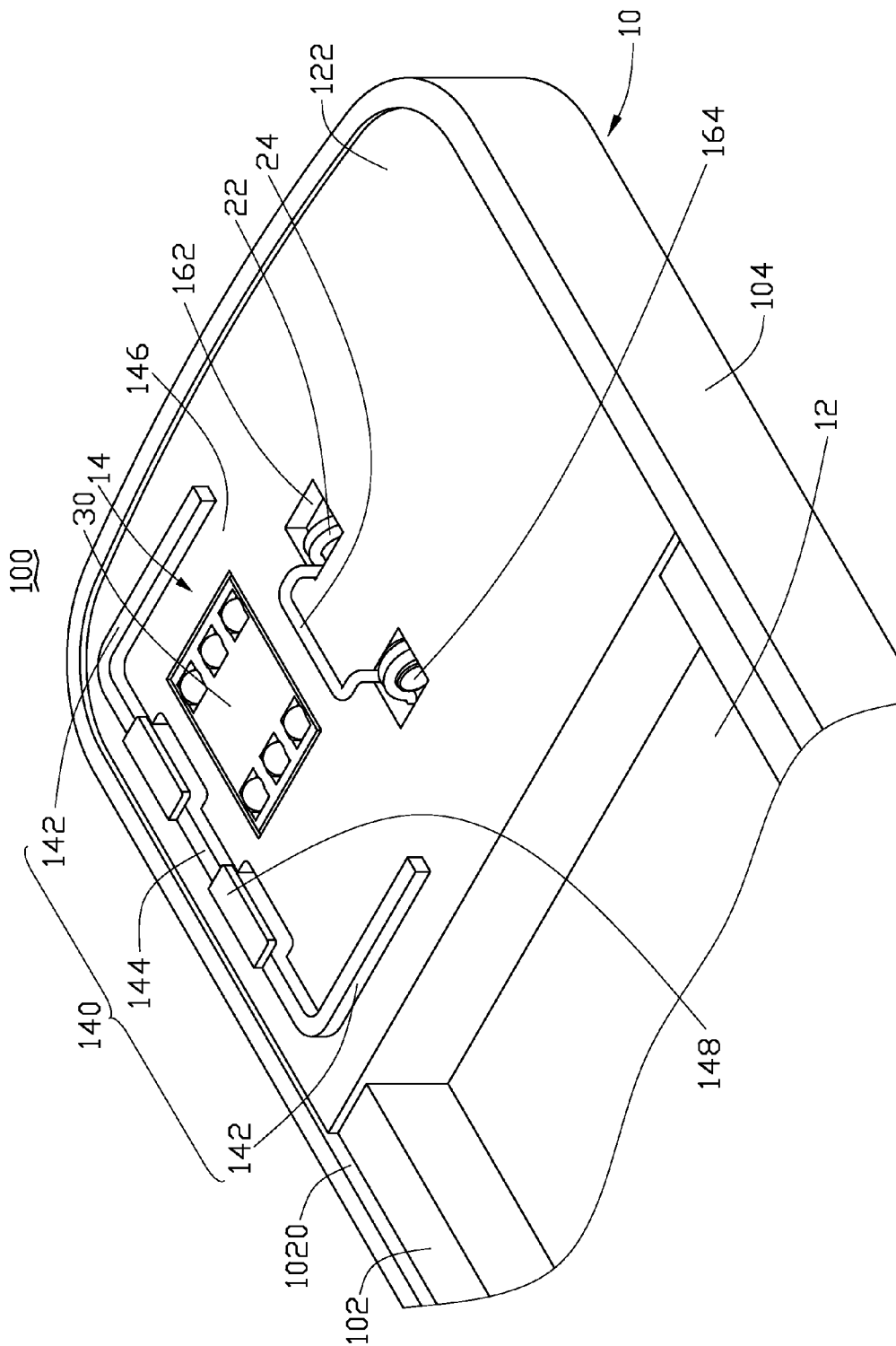
FIG. 3 is an assembled view of the surface contact card holder of FIGS. 1 and 2 without the surface contact card in place.
Figure 4:
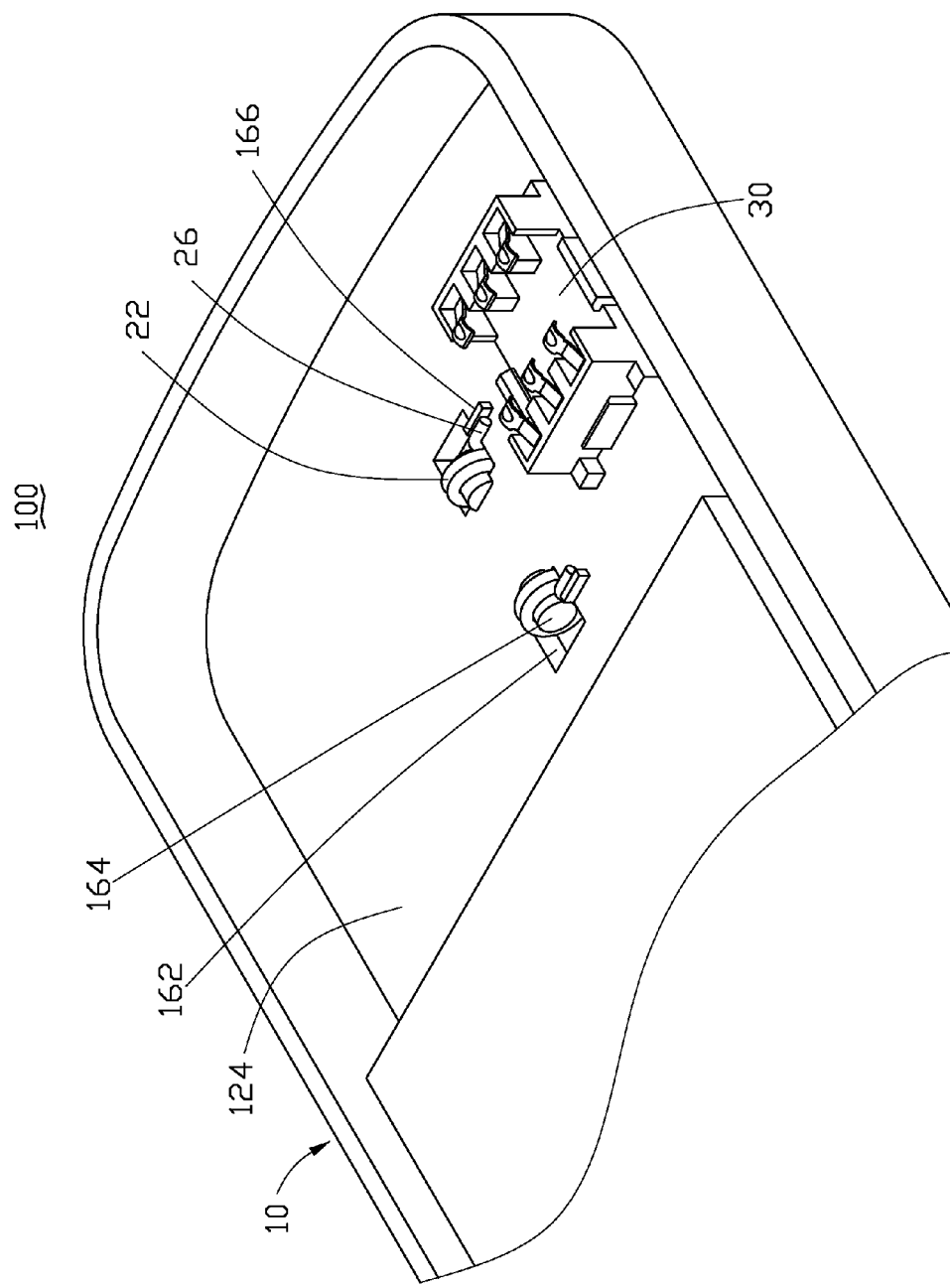
FIG. 4 is similar to FIG. 3 but viewed from another aspect.

During assembly, referring to FIGS. 3 and 4, the elastic element 20 exerts a predetermined torsion. Then, each bending portion 22 is inserted into a corresponding notch 162 of the latching portion 16, and each bending portion 22 is placed around a corresponding post 164. At the same time, each resisting end 26 lowers into another side from one side of each notch 162 and resists a corresponding protrusion 166 of the latching portion 16. Accordingly, the elastic element 20 is attached to the latch portion 16 of the main body 10. The middle portion 24 of the elastic element 20 presses the open side 146 of the receiving portion 14.

Figure 5:
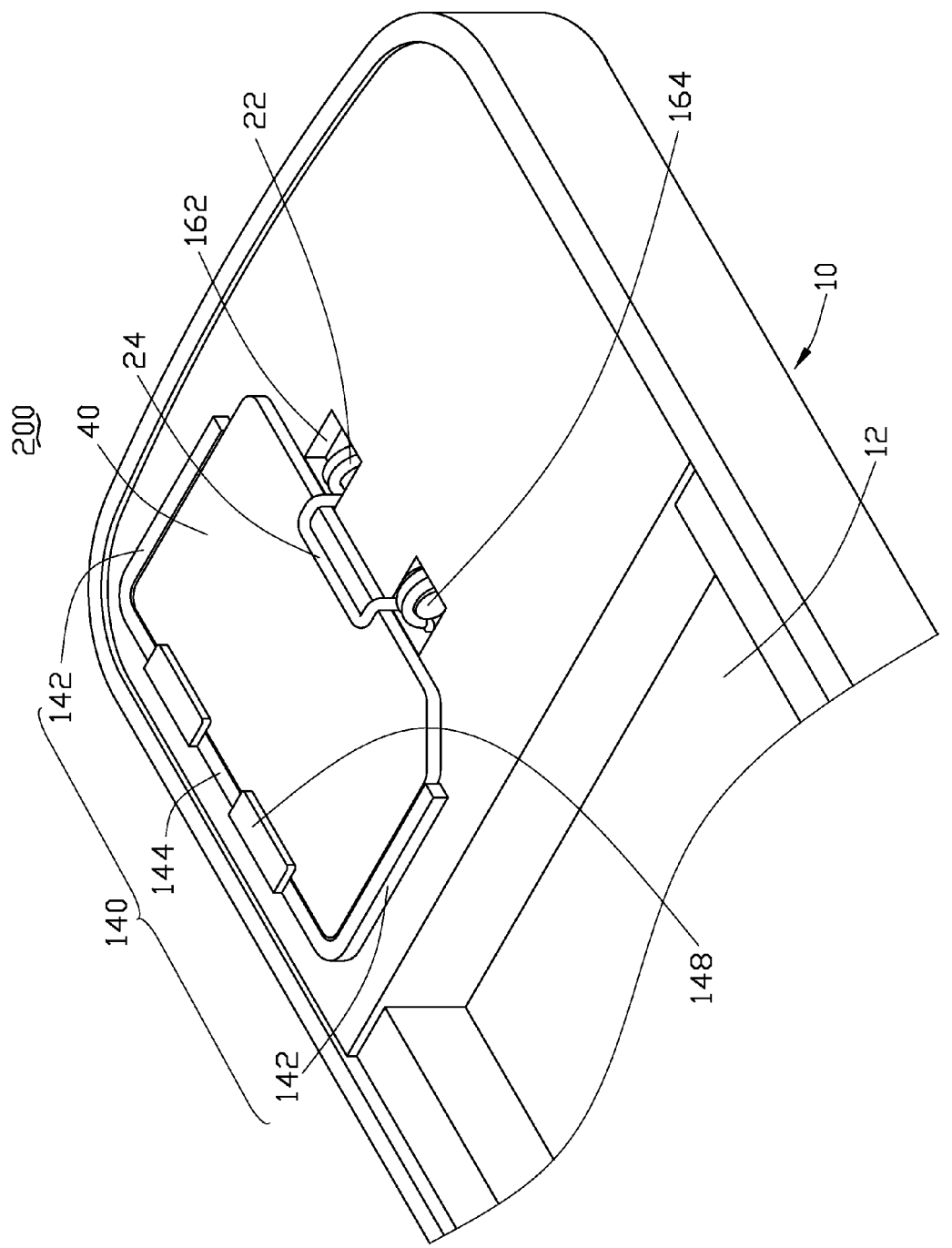
FIG. 5 is an assembled view of the surface contact card holder of the preferred embodiment, with the surface contact card in place.

In use, referring to FIG. 5, the user reversely (i.e., away from the receiving portion 14) pushes the middle portion 24 of the elastic element 20. Thus, the elastic element 20 moves off the receiving portion 14 of the main body 10. Then, the surface contact card 40 is inserted into the receiving portion 14 along the open side 146. The surface contact card 40 resists the projection block 140 so as to prevent the surface contact card 40 from further moving. The bumps 148 advantageously help prevent the surface contact card 40 from becoming separated from the receiving portion 14. After that, the elastic element 20 is released. The elastic element 20 automatically returns to its original position, under the predetermined torsion, so that the middle portion 24 presses on the surface contact card 40 again. The surface contact card 40 is thereby held steadily in the main body 10.

To remove the surface contact card 40, the user reversely pushes (i.e., away from the receiving portion 14) the middle portion 24 of the elastic element 20. Thus, the middle portion 24 moves away from the open side 146. Accordingly, the surface contact card 40 may be taken out from the receiving portion 14.

Figure 6:
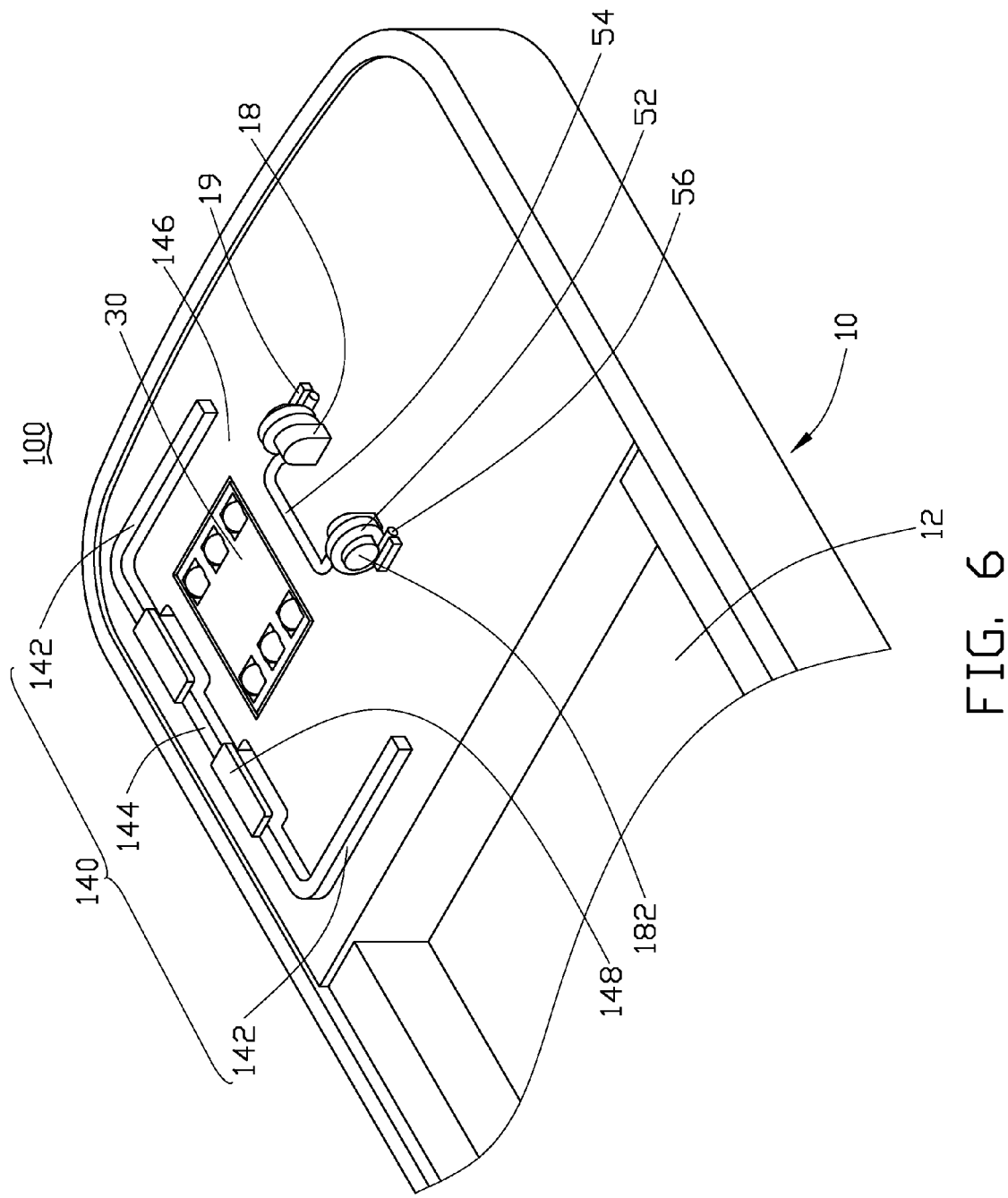
FIG. 6 is an assembled view of another surface contact card holder of another preferred embodiment.
Figure 7:
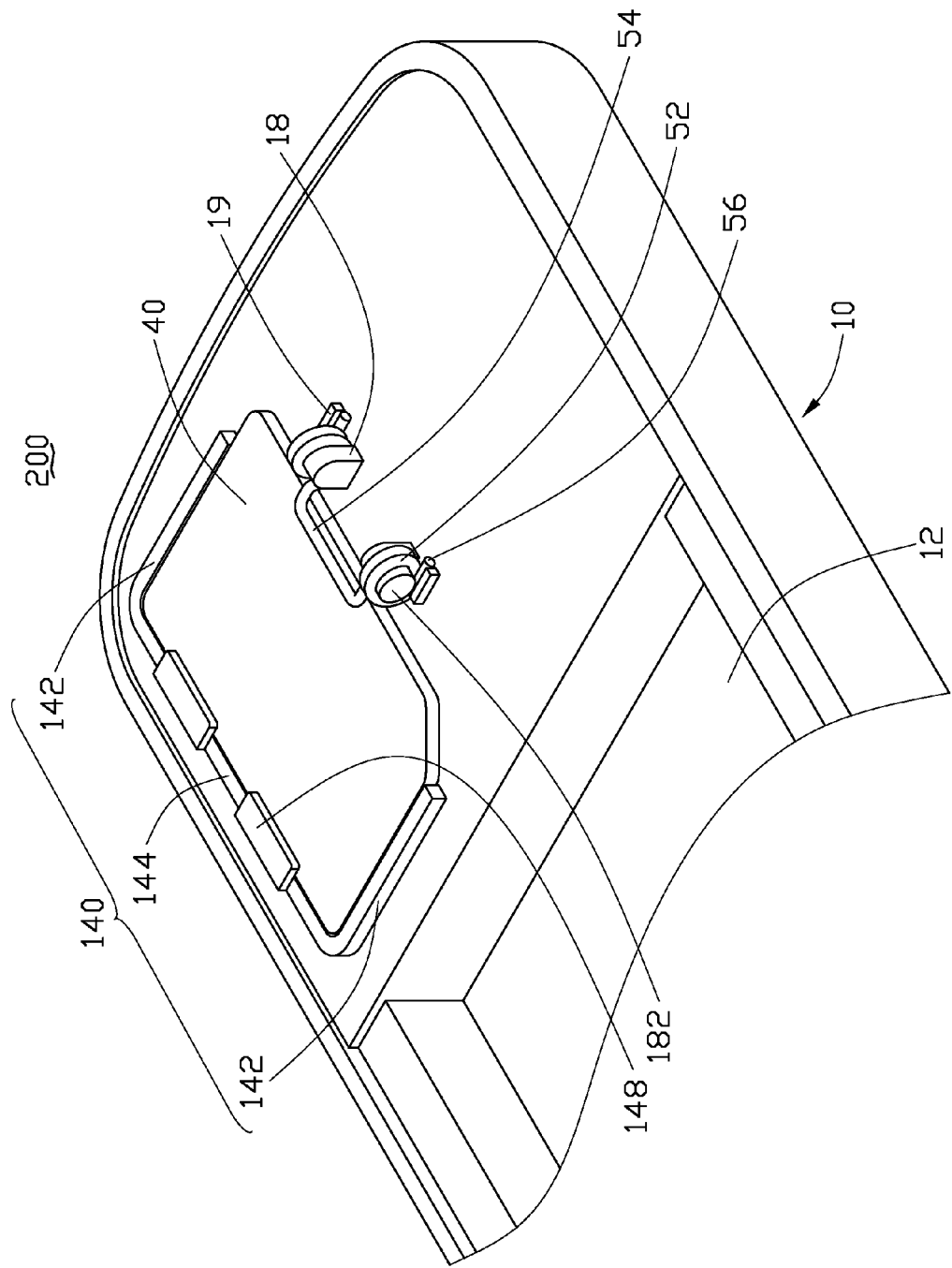
FIG. 7 is an assembled view of the surface contact card holder of FIG. 6, with a surface contact card in place.
Figure 8:
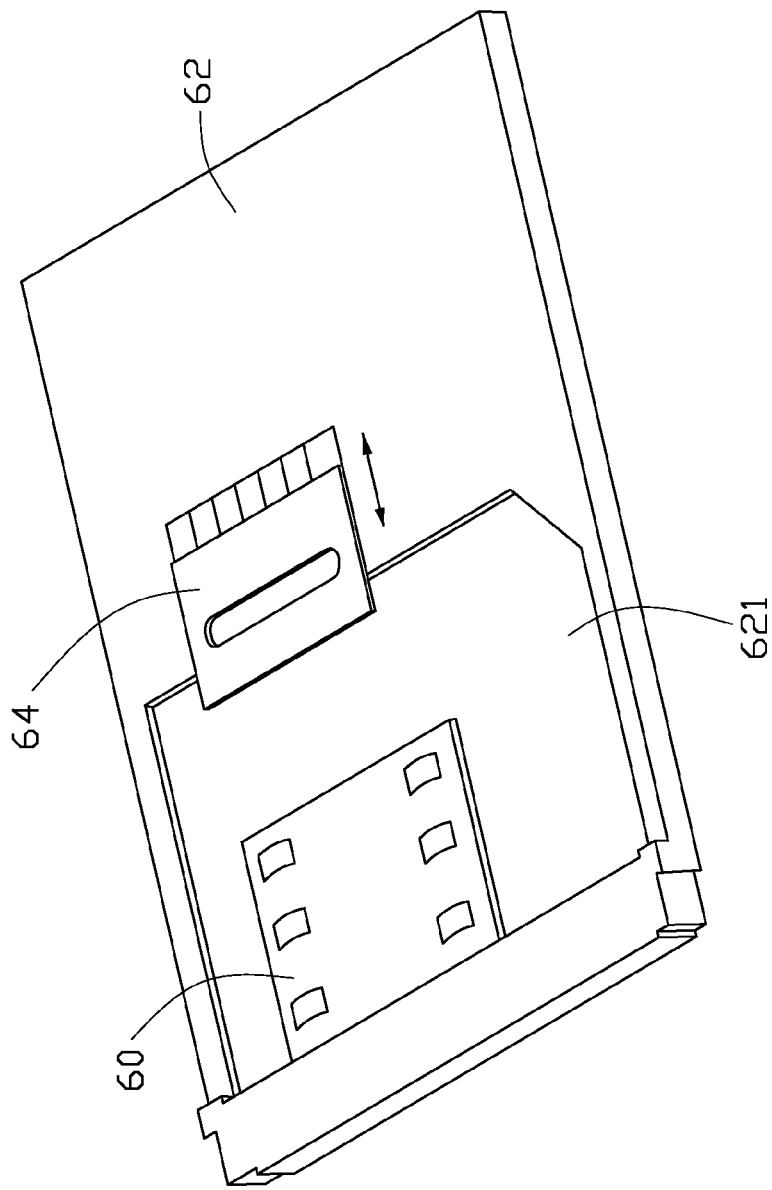
FIG. 8 is an assembled view of a conventional SIM card holder.

In another alternative embodiment, the latching portion and the elastic element may adopt other structures. Referring to FIGS. 6 and 7, the latching portion may be made of two knobs 18 and two bulges 19. The elastic element 50, as per this second embodiment, includes two bending portion 22 and a middle portion 54. Each knob 18 is substantially an L-shape, and extends from the first surface 122. Each knob 18 has a free end 182 parallel to the first surface 122. A diameter of the free end 182 of each knob 18 is slightly smaller than an inner diameter of each bending portion 52. Each bulge 19 is positioned adjacent to each knob 18. Each resisting end 56 of the elastic element 50, respectively, tangentially extends from a corresponding bending portion 52. During assembly, the two bending portions 52 of the elastic element 50 are placed around a corresponding free end 182 of the knob 18, and each resisting end 56 resists/biases against a corresponding bulge 19. In this way, the surface contact card 40 can be assembled or disassembled.

In a still further alternative embodiment, the elastic element disclosed above may be replaced with other structures. Understandably, the latching portion may be omitted and the elastic element may be fixed in the main body 10 using adhesive. The elastic element can act as a control element attached to the main body and may selectably resist the surface contact card 40.

A main advantage of the surface contact card holder is that the present surface contact card holder is able connect well with the connector and cannot easily separate from the receiving portion. Such an advantage is achieved by means of the projection block and the elastic element. Thus, this structure is able to hold the contact card steadily in the electronic device. In addition, when a person is installing or removing the surface contact card, he or she can hold the electronic device and operate the elastic element with one hand and remove the contact card simultaneously with another hand. Therefore, the surface contact card holder offers both simplicity and ease of use.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A holder for holding a surface contact card, comprising:
a main body forming a receiving portion, the receiving portion being configured for receiving the surface contact card therein;
a latching portion carried on the main body, the latching portion being adjacent to the receiving portion; and
an elastic element rotatably hinged to the latching portion and configured for selectably resisting the surface contact card, the elastic element including two bending portions and a middle portion connected to each other, and each bending portion having a resisting end radially extending from a distal end thereof.

2. The holder as claimed in claim 1, wherein the receiving portion includes a projection block, the projection block is a beam protruding on the main body and the projection block partially surrounds a space configured for receiving the surface contact card.

3. The holder as claimed in claim 2, wherein the projection block includes two end portions and a connecting portion, each end portion extends from a distal end of the connecting portion, and the two end portions and the connecting portion co-operatively form a rectangular-bracket-shaped area with an open side.

4. The bolder as claimed in claim 1, wherein the latching portion includes at least one notch and at least one post, the at least one notch is defined on the main body at a position opposite to the receiving portion, and the at least one post extends from a sidewall of the at least one notch.

5. The holder as claimed in claim 4, wherein the at least one post perpendicularly extends from the sidewall, the at least one post is substantially cylindrical, the at least one past is coplanar with one side of the main body, and the other side of the at least one post is spaced apart from the other side of the main body.

6. The holder as claimed in claim 5, wherein the latching portion further comprises at least one protrusion, and each protrusion is positioned adjacent to each post.

7. A holder for holding a surface contact card in a portable electronic device, the electronic device having a device body, the holder comprising:
- a receiving portion formed on the device body and being configured for receiving the surface contact card, the receiving portion being a projection block, the projection block including two end portions and a connecting portion, each end portion perpendicularly extending from a distal end of the connecting portion, thus co-operatively forming a rectangular-bracket-shaped area; and
- an elastic element rotatably hinged to the device body and configured for pressing on the surface contact card, the elastic element including two bending portions and a middle portion connected to each other, the middle portion pressing an open side of the rectangular-bracket-shaped area, and the two bending portions being rotatably attached to the device body.

8. The holder as claimed in claim 7, wherein at least one bump extends from the connecting portion of the projection block so as to limit the surface contact card to selectably moving one of upward and downward.

9. The holder as claimed in claim 8, wherein two bumps are symmetrically fanned on the connecting portion.

10. The holder as claimed in claim 7, further comprising a latch portion, wherein the latch portion includes two knobs and two bulges, the elastic element further comprises two resisting ends, respectively, tangentially extending from a corresponding bending portion, each bending portion is placed around a corresponding knob, and each resisting end resists a corresponding bulge.

11. A portable electronic device comprising:
- a device body forming a receiving portion, the receiving portion being configured for receiving a surface contact card, the receiving portion partially enclosing the surface contact card so as to keep the contact surface card in the receiving portion, the receiving portion comprising a projection block, the projection block including two end portions and a connecting portion, and each end portion extending from a distal end of the connecting portion; and
- a control element rotatably hinged on the opposite side of the receiving portion and configured for selectably blocking the surface contact card from exiting from the receiving portion, the control element being an elastic element, the elastic element including two bending portions and a middle portion connected each other, the middle portion pressing the receiving portion, and the two bending portions being rotatably attached to the device body.

12. The portable electronic device as claimed in claim 11, further comprising a latch portion, wherein the latch portion includes two cylinders extending from the device body, and each bending portion is placed around a corresponding cylinder.

* * * * *